United States Patent [19]

Simotti

[11] Patent Number: 5,720,316

[45] Date of Patent: Feb. 24, 1998

[54] SANITARY FITTING

[75] Inventor: Vittore Simotti, Aarau, Switzerland

[73] Assignee: KWC AG, Unterkulm, Switzerland

[21] Appl. No.: 523,143

[22] Filed: Sep. 5, 1995

[30] Foreign Application Priority Data

Sep. 12, 1994 [EP] European Pat. Off. ............ 94114281

[51] Int. Cl.[6] .................................................. F16K 27/00
[52] U.S. Cl. ...................................... 137/454.2; 137/607
[58] Field of Search .......................... 137/454.2, 454.5, 137/454.6, 606, 607

[56] References Cited

U.S. PATENT DOCUMENTS

| | | | |
|---|---|---|---|
| 3,169,549 | 2/1965 | Quick | 137/454.6 X |
| 3,473,603 | 10/1969 | Fujie | 165/122 |
| 4,331,176 | 5/1982 | Parkison | 137/454.5 |
| 4,681,141 | 7/1987 | Wang | 137/607 |
| 4,979,530 | 12/1990 | Breda | 137/454.2 X |
| 5,090,062 | 2/1992 | Hochstrasser | 4/192 |
| 5,095,554 | 3/1992 | Gloor | 137/801 |
| 5,111,846 | 5/1992 | Hochstrasser et al. | 137/607 |
| 5,293,901 | 3/1994 | Guzzini | 137/595 |

*Primary Examiner*—Stephen M. Hepperle
*Attorney, Agent, or Firm*—Oliff & Berridge

[57] ABSTRACT

A sanitary fitting for a washbasin includes a water inlet, a water outlet, and a shut-off valve which is provided in a control cartridge and is connected to the water inlet via a supply line and to the water outlet via an outlet line. The control cartridge is supported by a bearing element which is capable of fastening the fitting to a washbasin. A housing is slipped over the bearing element. A cylindrical clearance for receiving the control cartridge is provided in the bearing element. The supply line and the outlet line are formed at least partially as ducts in the bearing element that open into the clearance. The control cartridge includes openings through which the shut-off valve is in flow connection with the ducts. The housing includes a through-passage which permits the control cartridge to pass therethrough into the clearance.

19 Claims, 4 Drawing Sheets

SANITARY FITTING

BACKGROUND OF THE INVENTION

1. Field of the Invention

The present invention relates to a sanitary fitting and in particular to a sanitary fitting for a washbasin.

2. Description of Related Art

Sanitary fittings are well known. For example, EP-A-0 432 440, corresponding to U.S. Pat. No. 5,111,846, discloses a fitting having an L-shaped bearing element fastened on a washbasin by a threaded fastener. A shut-off valve block is fastened on the bearing element by screws and is connected to one supply line each for cold water and for hot water. The supply lines are formed as pipes which are guided through through-passages in the bearing element. Seated on the shut-off valve block is an auxiliary valve block fastened thereto by screws. An outlet line leads from the auxiliary valve block to a water outlet head. The active parts of the fitting are covered by a removable, hood-like housing.

Other fittings currently available on the market have a similar construction. Specifically, the parts that bear the shut-off valves and the mixing unit are screwed onto a bearing element on which a housing or hood for covering the parts is also screwed. Also available are fittings that have a control cartridge partially accommodated in a housing that is fastenable to a washbasin (see, for example, EP-A-0 455 998 or EP-A-0 432 553).

A drawback with the above-described fittings is that their respective configurations require relatively large amounts of time for assembly and inspection. The fittings either have to be sent back to the manufacturer for the inspection of components in the interior of the housing, or the fittings must be completely dismantled on site by the sanitary engineer. Consequently, the conventional fittings are costly to produce and maintain.

SUMMARY OF THE INVENTION

It is an object of the present invention to provide a sanitary fitting which has a simple construction and can be dismantled and assembled quickly and easily, thereby permitting time-saving and cost-effective mounting and inspection at the installation site.

To achieve the above and other objects of the present invention, a sanitary fitting constructed in accordance with an embodiment of the invention includes a control cartridge having a liquid shut-off valve and a bearing element having a clearance and at least one duct formed therein. The control cartridge is positioned in the clearance and the at least one duct opens into the clearance. A housing fastened on the bearing element at least partially encloses the control cartridge and includes at least one through-passage permitting access to the clearance formed in the bearing element. The at least one through passage is sized to permit the control passage to pass therethrough.

With the above arrangement, in addition to rapid exchangeability, the mounting arrangement of the control cartridge to the bearing element is such that the connection openings between the bearing element and the control cartridge can be aligned in a simple and precise manner. Further, the simple fastening arrangement of the housing on the bearing element using the control cartridge facilitates assembly and disassembly of the fitting. Consequently, the modular parts of the fitting can be held together by a single fastening element, e.g., a single screw. In addition, the preferably symmetrical construction of the control cartridge facilitates access to the components of the control cartridge, such as the shut-off valve. A further advantage of the fitting according to the present invention is the sturdy construction which is thus made possible, rendering the fitting difficult to vandalize.

Further advantages and salient features of the invention are apparent from the following description.

BRIEF DESCRIPTION OF THE DRAWINGS

The invention is explained in more detail with reference to an exemplary embodiment which is represented in the following drawings in which like reference numerals refer to like elements and wherein.

DETAILED DESCRIPTION OF PREFERRED EMBODIMENTS

Figure 1A:
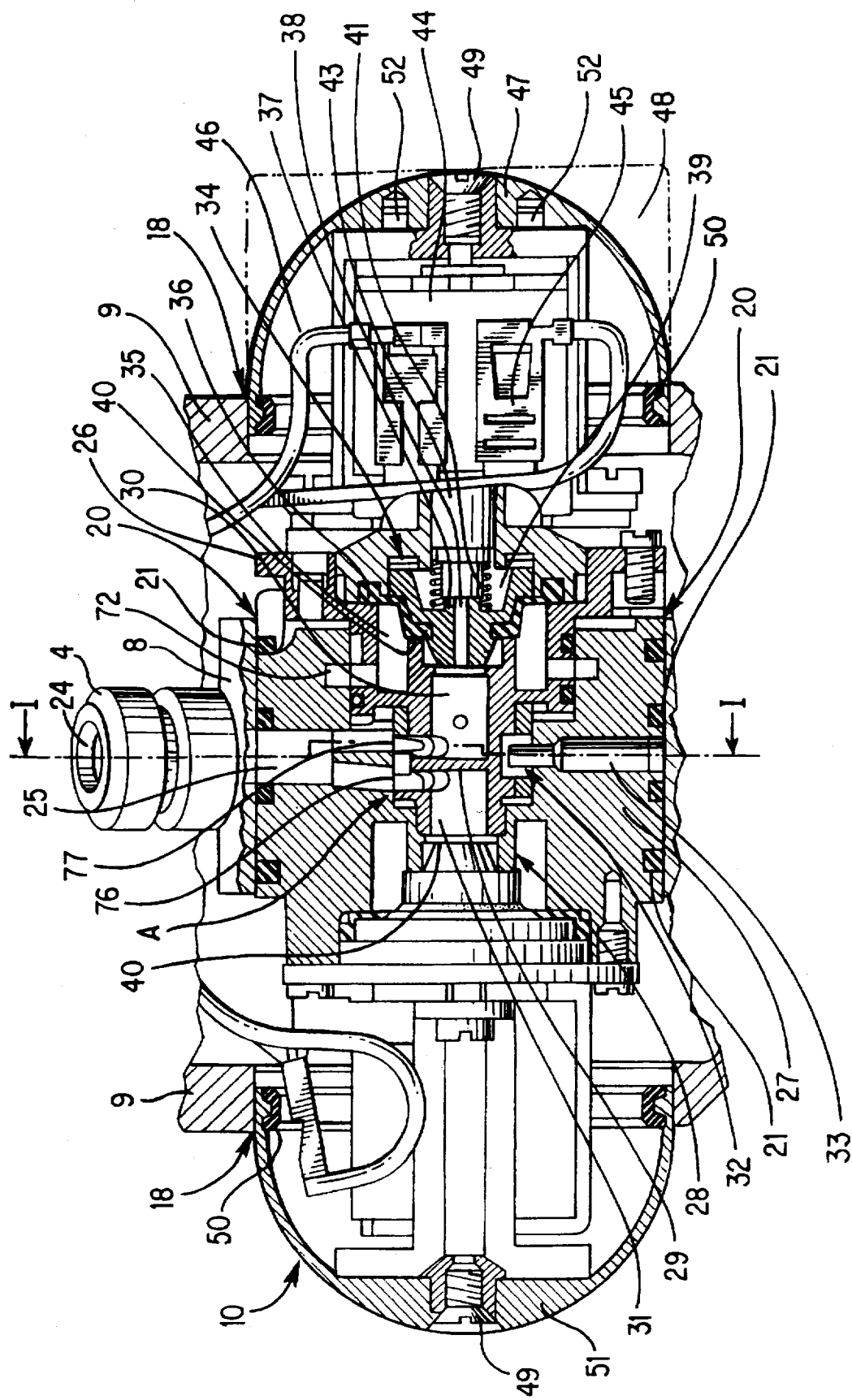
FIG. 1, which consists of FIG. 1A and FIG. 1B, is a cross-sectional view of a fitting in accordance with an embodiment of the invention taken along the longitudinal direction of the control cartridge.
Figure 1B:
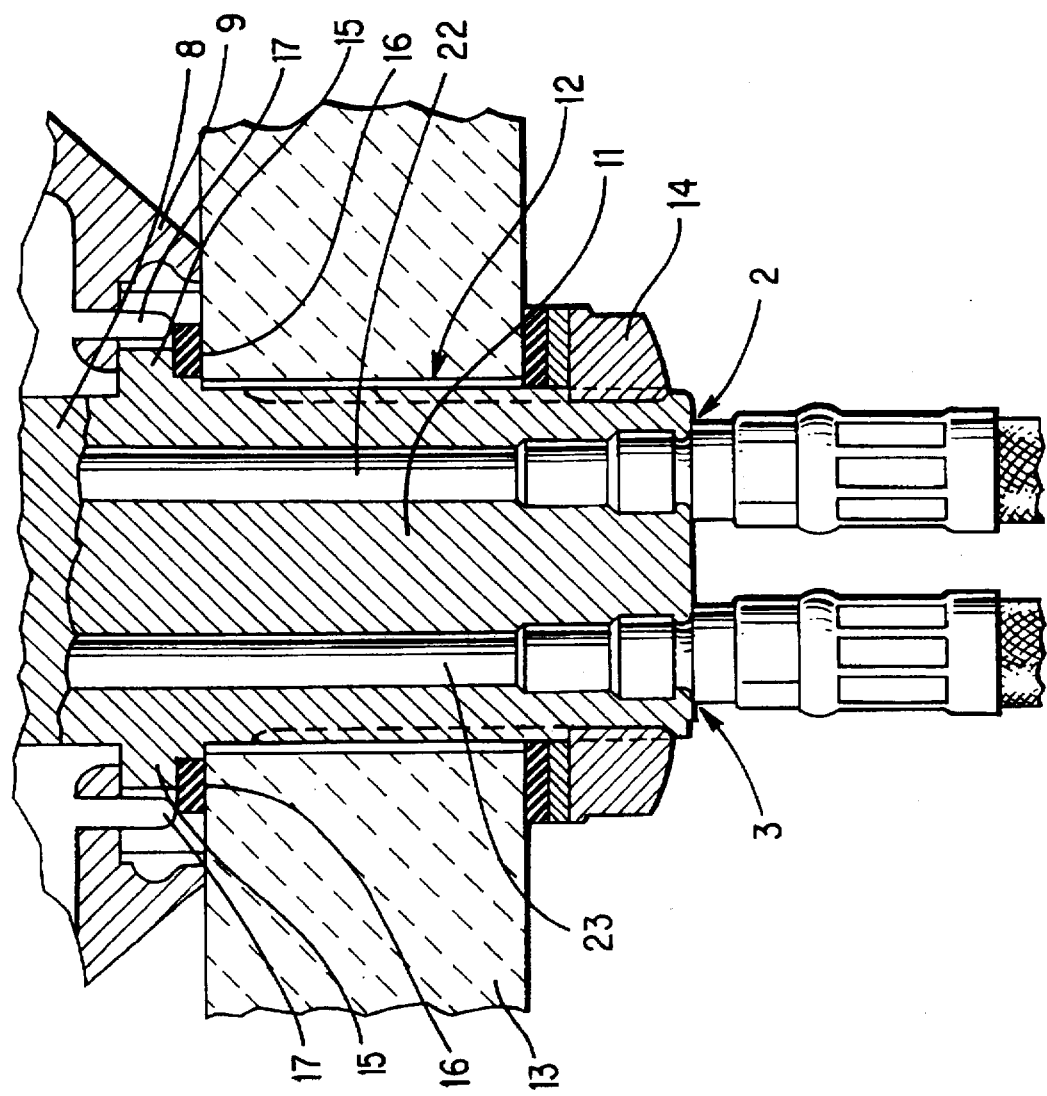
Figure 2:
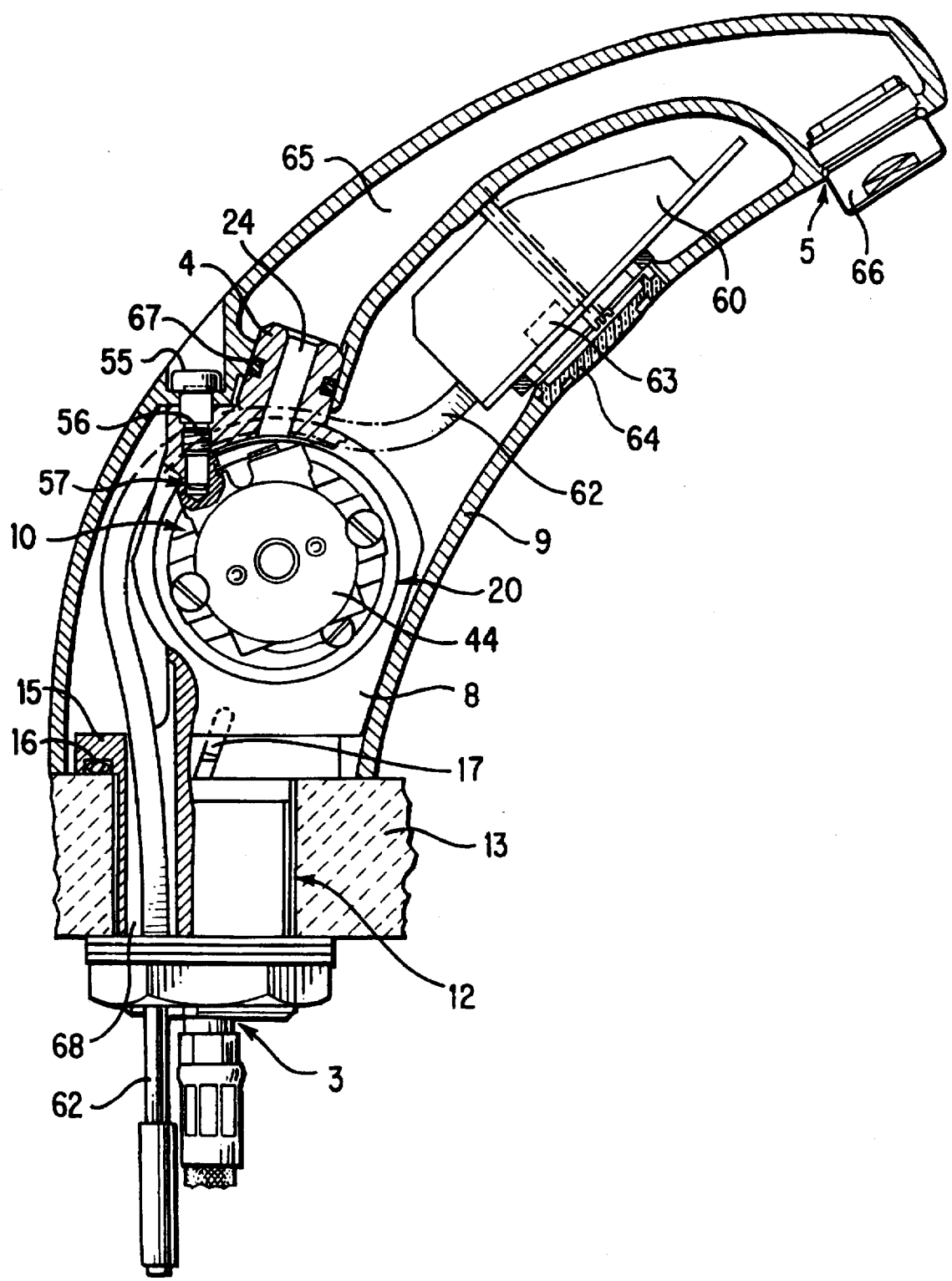
FIG. 2 is a partial cross-sectional side view of the fitting of FIG. 1 taken in a direction perpendicular to the longitudinal direction of the control cartridge.

Shown partially in FIG. 1 is an electronically controlled sanitary fitting 1 used with, for example, a washbasin. The fitting has a cold-water inlet 2, a hot-water inlet 3, and a connection stub 4 connected to a mixed-water outlet 5 (FIG. 2). The fitting 1 also includes three modular components consisting of, respectively, a bearing element 8, a housing 9 slipped over the bearing element 8, and a control cartridge 10 inserted into the bearing element 8 through the housing 9.

The bearing element 8 is guided through a cylindrical opening 12 in a washbasin 13 by a fastening stub 11 and is fastened by a retaining nut 14 to the washbasin. The bearing element 8 is provided, at a position above the washbasin 13, with an annular bead 15 which clamps a sealing ring 16 to the washbasin. Guide elements or pins 17 are fastened on an inner flange of the housing proximate to the washbasin 13 and engage into groove-like clearances of the bead 15 of the bearing element 8. A conventional sealing ring and a washer arrangement for fastening the fitting to the washbasin 13 are provided beneath the washbasin.

Circular through-passages 18 for receiving the control cartridge 10 are provided on mutually opposite sides of the housing 9. In the bearing element 8, above the bead 15, a circularly cylindrical clearance 20 is provided at right angles with respect to the longitudinal direction of the sanitary fitting 1. The control cartridge 10 is pushed through the clearance 20. The diameter of the circular through-passages 18 is somewhat larger than the diameter of the circularly cylindrical clearance 20 arranged coaxially thereto. This ensures that the control cartridge 10 is inserted without difficulty. The control cartridge 10 is retained in a water-tight manner in the clearance 20 by, for example, elastomeric sealing rings 21.

Accommodated in the bearing element 8 are supply lines from the corresponding water inlets 2, 3 which include a cold-water duct 22 and a hot-water duct 23. The ducts 22,23 open into the circularly cylindrical clearance 20. A connecting duct 24, which is connected to and in fluid communication with a mixed-water duct 25 in the control cartridge 10, runs through the connection stub 4.

The control cartridge 10 includes a rotationally movable part 26 and a stationary part 27. As shown in FIG. 1, the two parts 26, 27 are tapered in a stepwise manner. The rotationally movable part 26 engages into the stationary part 27. A control element A is positioned between the rotationally movable part 26 and the stationary part 27. The control element A has a rotationally symmetrical hollow body 28 in the rotationally movable part 26 and circular openings 76, 77 in the stationary part 27. The hollow body 28 is divided by a partition wall 29 into a cold-water chamber 30 and a hot-water chamber 31. In this example, the two chambers 30 and 31 are of a circularly cylindrical design. However, it is also possible for other rotationally symmetrical hollow bodies, e.g., a hollow truncated circular cone, to be used for the chambers 30, 31. The mixed-water duct 25 in the stationary part 27 branches, on the side facing the rotationally movable part 26, into two sub-ducts having circular openings 76, 77. The control element A is described in more detail below in conjunction with FIG. 3.

A restricting groove 32 is provided circumferentially around the rotationally movable part 26. An inwardly projecting pin 33 fastened on the stationary part 27 of the control cartridge 10 is radially inserted in the groove 32. The groove 32 is wider than the diameter of the pin 33. Consequently, the pin does not rest against the side walls of the groove 32. Together with the ends or stops of the groove 32, the pin 33 forms a rotation-limiting device for the rotationally movable part 26 of the control cartridge 10.

In FIG. 1, to the right of the rotation-limiting device, a shut-off valve 34 for cold water is provided in the rotationally movable part 26. The shut-off valve has an annular duct 35, a closure part 36 comprising, for example, an elastomeric diaphragm, a retaining head or annular reinforcement part 37 with a central opening 38, and a pilot-control chamber 39. As shown in the drawing, the elastomeric diaphragm 36 forms a seal against an annular valve seat 40 on the hollow body 28. The elastomeric diaphragm 36 also includes a small through-passage (not shown) between the annular duct 35 and the pilot-control chamber 39. A compression spring 41 is positioned between the reinforcement part 37 and the stepped, pin-like armature 43 of an electromagnetic actuating member or electromagnet 44. After the shut-off valve 34 is opened, the compression spring 41 forces the diaphragm 36 in a direction towards the valve seat 40.

The operation of the shut-off valve 34 is well known and is explained, for example, in European Patent Application EP-A-0 429 915. When the shut-off valve 34 is open, the pressure in the pilot-control chamber 39 decreases because the central opening 38 in the annular reinforcement part 37 is greater in size than the through-passage (not shown) in the closure part 36. Therefore, the closure part 36 will be pushed to the right in FIG. 1 and thus the shut-off valve, comprising the valve seat 40 and the reinforcement part 37 with the closure part 36, will be opened. The force of the compression spring 41 is overcome temporarily by the pressure differential. After the central opening 38 in the reinforcement part 37 is closed, the pressure differential is eliminated and the compression spring 41 pushes the closure part 36 to the left against the valve seat 40 in FIG. 1.

The electromagnet 44 is connected at terminals 45 to an electronic control unit 60 via electric cables 46 (FIG. 2). A dome-like rotary knob 47 with a wing 48 (outlined by a dashed line) is fastened onto the electromagnet 44 by a screw 49. Positioning pins 52, which engage into corresponding blind bores in the rotary knob 47, are attached to the electromagnet 44. A small groove into which a sealing ring 50 engages by sealing lips formed thereon is formed on the inner circumference of the base of the dome-like rotary knob 47. As shown, the base of the rotary knob 47 passes together with the sealing ring 50 through the through-passage 18 in the housing 9, forming a waterproof seal. The rotary knob also provides protection against vandalism. In FIG. 1, to the left of the control element A, a similar shut-off valve 34 is provided for hot water, with an electromagnet 44 fastened onto the stationary part 27. In this case, the valve seat 40 is also connected to the stationary part 27 of the control cartridge 10. A dome-like covering 51, similar to the rotary knob 47 but without the wing, is fastened onto the left-hand electromagnet 44 by, for example, a screw 49.

FIG. 2 is a partial cross-sectional view taken along line I—I in FIG. 1. FIG. 2 clearly shows the fastening of the bearing element 8 onto the washbasin 13 and the fastening of the housing 9, which is slipped over and fastened to the bearing element 8. The connection stub 4 and the guide pins 17 are aligned in the same direction, i.e., at an angle of approximately 15° with respect to the longitudinal axis of the fastening stub 11. Consequently, the housing 9 is aligned when it is slipped over the bearing element 8. The housing 9 is fastened onto the bearing element 8 by a single hexagon socket screw 55. As shown, the screw 55 is of a step-like configuration and has a thread 56 only in the central region. The end of the screw 55 is formed as a pin and engages with a blind bore 57 in the stationary part 27 of the control cartridge 10. The control cartridge 10 is thus fastened to the bearing element 8 and secured against rotation and lateral displacement. The screw 55 also ensures that the openings of the ducts 22–24, which open into the clearance 20 and form parts of the supply lines and the outlet line, align with the connection openings of the control cartridge 10.

The electronic control unit 60 is arranged above the bearing element 8 in the housing 9 and is offset with respect to the longitudinal direction of the fastening stub 11. The electronic control unit 60 is provided with a radar sensor 63 (shown by broken lines). The electronic control unit 60 is electrically connected at one end to a power-supply cable 62 and at the other end, via the cable 46, to the electromagnets 44 (FIG. 1). A window 64, preferably formed from a transparent plastic material, is provided in the housing 9 at a position corresponding to the radar sensor 63. The window 64 may, however, be non-transparent since plastic material, whether transparent or non-transparent, does not normally obstruct high-frequency radar signals. In the housing 9, an outflow duct 65, which forms a section of the outlet line, is formed above the bearing element 8 and passes over the electronic control unit 60. An outflow head 66 is screwed into the top end of the outflow duct 65. The other end of the outflow duct 65, which faces the bearing element 8, is slipped onto the connection stub 4 and sealed, for example, by an elastomeric sealing ring 67. A cable duct 68, formed in the bearing element 8, allows the power-supply cable 62 to pass through the fastening stub 11.

Figure 3:
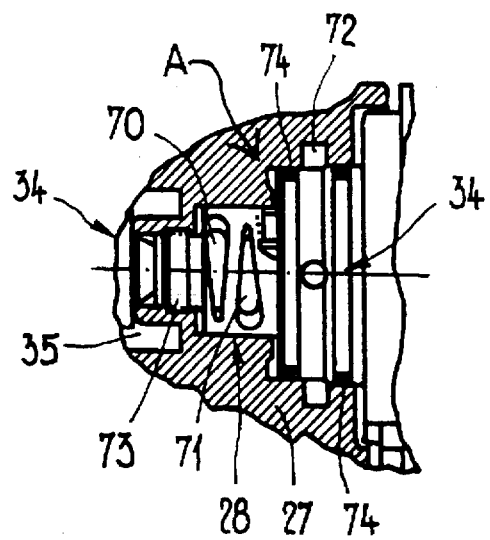
FIG. 3 is a partial cross-sectional view of a control element of the embodiment of FIG. 1.

FIG. 3 is a partial cross-section of the control element A. On the left-hand side of the figure is shown part of the shut-off valve 34 with its annular duct 35. Two radial tear-drop-shaped through-passages 70, 71, tapered counter to one another in the circumferential direction, are provided in the wall of the rotationally symmetrical hollow body 28. The through-passages 70, 71 align with the openings 76, 77 of the sub-ducts of the mixed-water duct 25 (FIG. 1). A connecting annular groove 72 is shown on the right of the through-passages 70 and 71. The groove 72 is in flow connection with the annular duct 35 of the right-hand shut-off valve 34 and with the cold-water inlet 2 via a connection duct 75 in the stationary part 27 (FIG. 4) and the cold-water duct 22 (FIG. 1).

The rotationally movable part 26 is mounted in the stationary part 27 of the control cartridge 10 by a fine-threaded section 73 provided on the rotationally movable part 26. Elastomeric o-rings 74 provide a seal between the rotationally movable part 26 and the stationary part 27.

Figure 4:
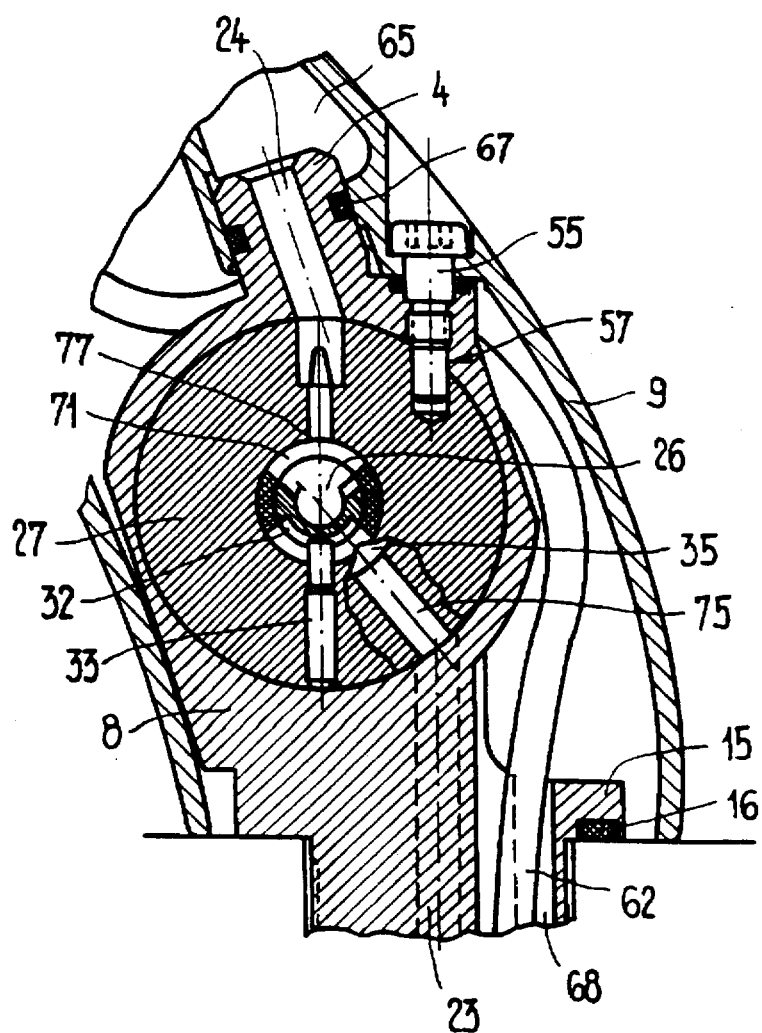
FIG. 4 is a cross-sectional view of the fitting taken along line I—I in FIG. 1 in a direction opposite from the side view of FIG. 2.

FIG. 4 is a cross-section taken along line I—I in FIG. 1, as seen from the direction opposite to that of FIG. 2. The restricting groove 32 has approximately the same arc length as that of the tear-drop-shaped through-passages 70, 71 (FIG. 3). It is thus ensured that a uniform rate of water can continuously flow through the control element A.

The connection of the annular duct 35 to the hot-water duct 23 via the connection duct 75 (indicated by broken lines) is emphasized here in partial section. The partial section is in a plane which runs through the longitudinal axis of the hot-water duct 23 (FIG. 1). The connection duct 75 is located in the stationary part 26 of the control cartridge 10.

A similar flow connection is arranged for the annular duct 35 of the right-hand shut-off valve 34 with the connection duct (not shown) likewise located in the stationary part 26 of the control cartridge 10. In this case, cold water flows to the annular duct 35 via the connecting groove 72 (FIGS. 1 and 3).

The mounting operation of the sanitary fitting 1 with the three modular parts will now be explained with reference to FIGS. 1, 2 and 4.

The individual parts of the control cartridge 10 are first assembled, without fastening the rotary knob 47 and the similar covering 51. The power-supply cable 62 is then threaded through the cable duct 68. The housing 9 is then slipped over the bearing element 8 with the guide pins 17 and the connection stub 4 ensuring accurate positioning. Thereafter, the electric cables 46 are guided to the outside of the fitting through the through-passages 18 of the housing 9. The electric cables 46 have excess length to aid in threading the cables.

The control cartridge 10 is next pushed into the clearance 20, and the terminals 45 are plugged onto corresponding flat connectors of the electromagnets 44 as the control cartridge 10 is pushed into the bearing element 8. The excess length of the cables 46 is then pushed back into the housing. The hexagon socket screw 55 is screwed into the bearing element 8, and the dome-like rotary knob 47 and the covering 51 are screwed onto the respective electromagnets 44. In this arrangement, the rotary knob 47 is correctly positioned by the positioning pins 52.

The sanitary fitting 1 mounted in this manner is then ready to be fastened onto a washbasin 13. All that remains is for the sanitary engineer to tighten the retaining nut 14 and to connect the power-supply cable 62 and the connecting pipes for hot water and cold water by commonly known procedures.

Dismantling of the fitting 1 can be carried out on site, if necessary, by reversing the order of the above described mounting operation. Consequently, shut-off valves 34 and/or electromagnets 44 can be replaced very rapidly during inspection. A sanitary fitting 1 can be inspected without being sent back to the manufacturer, resulting in considerable time and labor savings.

The operation of the sanitary fitting 1 is next described.

Hands or articles which are to be washed are detected by the radar sensor 63 in the region of the outflow head 66, and the control electronics unit 60 activates the electromagnets 44. The electromagnets 44 fully open the shut-off valves 34 for cold and hot water. The rotary knob 47 can be used to adjust the control element A, thereby controlling the water temperature by virtue of the mixture of cold and hot water. It is also possible, however, to adjust control element A during mounting using a screw. In this case, there is no rotary knob 47 on the sanitary fitting 1, but only a stationary dome-like covering similar to the covering 51.

The function of the control element A is as follows: the openings 76 and 77, opening into the clearance 20 of the mixed-water duct 25 (FIGS. 1 and 4), are located on a line parallel to the longitudinal direction of the control cartridge 10. The openings 76, 77 are located precisely opposite the through-passages 70, 71 so that a fluid connection is formed. When the rotationally movable part 26 of the control cartridge 10 is rotated, the flow rate through the openings 76, 77 is changed in inverse proportion.

When the threaded section 73 of the rotationally movable part 26 is rotated, the rotationally movable part 26 is slightly displaced in relation to the stationary part 27. Therefore, the groove 32 is formed to be slightly wider than the pin 33 (FIG. 1).

If the flow, for example, of hot water (left-hand side) is increased, the flow of cold water (right-hand side) is decreased in inverse proportion. Thus, the flow rate remains constant provided that the pressures for hot water and cold water are equal. The control cartridge can be used to set any water temperature between the temperatures of the hot water and the cold water.

It is obvious that the result of the present invention may also be achieved by a control cartridge which is pushed from one side into a continuous or blind-hole-like clearance and/or has a single shut-off valve for cold and hot water. The only stipulation is that the connection ducts must open into the clearance and be aligned with the connection openings of the control cartridge. The geometry of the entire arrangement of the embodiment represented in the figures is used only as an example, and is not intended to limit the present invention.

Furthermore, it is self-evident to a person skilled in the art that other control element configurations may be used. For example, a control element could be used in which the rotationally symmetrical hollow body does not have a partition wall, but rather is formed with a continuous chamber. The openings located opposite the through-passages are, in contrast, connected to the cold-water and hot-water inlets via separate ducts or pipes. In this case, the hollow body may likewise be rotatably mounted with the rotationally movable part of the control cartridge.

Reverse mounting of the parts is also possible. For example, on the disclosed embodiment, the water is mixed in the circular cylinder and is then channeled, via an annular groove, to the outflow duct in the housing. However, it is also possible for the stationary part 27 of the control cartridge to be mounted in a rotationally movable manner and, conversely, for the rotationally movable part 26 to be fastened in the bearing element 8 in a stationary manner. The corresponding geometrical arrangement and design of the connections in the form of annular grooves and circular connection openings are self-evident to a person skilled in the art.

It is also possible to fasten the control cartridge 10 without a fastening screw. For example, an annular latch-in spring could engage into a circumferential groove. The spring could be unlatched using a cam. Other fasteners known to a person skilled in the art could alternatively be employed.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the scope of the invention as defined in the following claims.

What is claimed is:

1. A fitting, comprising:
   a bearing element having at one end thereof at least one water inlet and at a second end thereof connecting means connected to an outlet, the first end and the second end defining a longitudinal axis of the fitting, a clearance formed in said bearing element transverse to the longitudinal direction, a supply duct opening into said at least one water inlet and an outlet duct opening into said clearance and connected to said connecting means;
   a housing slipped longitudinally over and fastened to said bearing element, said housing including at least one through-passage; and
   a control cartridge having a liquid shut-off valve and openings, said control cartridge being positioned in said clearance transverse to the longitudinal direction, said openings communicating with said supply duct and said outlet duct,
   wherein said at least one through-passage permits access to said clearance in said bearing element and said at least one through-passage is sized to permit the control cartridge to pass therethrough.

2. The fitting as claimed in claim 1, wherein the clearance is cylindrical.

3. The fitting as claimed in claim 1, wherein the clearance formed in the bearing element is open on one side of the bearing element.

4. The fitting as claimed in claim 3, wherein the clearance passes through the bearing element, and the at least one through-passage is coaxial with the clearance.

5. The fitting as claimed in claim 1, wherein the control cartridge is fastened in the clearance by a single pin.

6. The fitting as claimed in claim 5, wherein the single pin fixes the housing to the bearing element.

7. The fitting as claimed in claim 1, wherein the bearing element and the housing have cooperating housing guide elements.

8. The fitting as claimed in claim 7, wherein the housing guide elements include a connection stub having a water duct on the bearing element and a connection stub cooperating element formed on the housing.

9. The fitting as claimed in claim 1, further comprising a cold-water inlet and a hot-water inlet, the control cartridge including:
   a first shut-off valve connected to the cold water inlet;
   a second shut-off valve connected to the hot water inlet;
   a control element for controlling a mixing ratio of hot and cold water delivered to the shut-off valves; and
   at least one operating element projecting beyond the housing and rotatably fastened to the control cartridge, wherein the first and second shut-off valves are arranged on an axis and located opposite one another in the control cartridge and the at least one operating element being in operative connection with the control element.

10. The fitting as claimed in claim 9, wherein the control element has a rotationally symmetrical hollow body with first and second radial, tear-drop-shaped through-passages tapered counter to one another in a circumferential direction; and first and second openings which interact with and move with respect to said first and second through-passages to control water flow.

11. The fitting as claimed in claim 10, wherein the control cartridge has a part which is rotatably movable with respect to the bearing element and a part which is stationary with respect to the bearing element.

12. The fitting as claimed in claim 11, wherein a threaded connection is provided between the rotationally movable part and the stationary part of the control cartridge.

13. The fitting as claimed in claim 11, wherein a first part of the control cartridge is tapered in a stepwise manner, and a second part of the control cartridge is tapered in a stepwise manner and fits into said first tapered part.

14. The fitting as claimed in claim 11, further comprising a rotation-limiting device including a pin and a restricting groove in engagement with the pin.

15. The fitting as claimed in claim 11, wherein the first and second shut-off valves are each actuated by a separate electromagnetic actuating device.

16. The fitting as claimed in claim 11, wherein the hollow body is subdivided by a partition wall into a first chamber for hot water and a second chamber for cold water, said first and second openings discharging into a common duct, said first shut-off valve and said first and second tear-drop-shaped through-passages being arranged in the rotatably movable part of the control cartridge, and said second shut-off valve and said first and second openings being arranged in the stationary part of the control cartridge.

17. The fitting as claimed in claim 11, wherein said first and second openings are in flow connection with separate ducts for hot and cold water, respectively; said first and second shut-off valves being arranged in flow connection with said first and second openings in the stationary part of the control cartridge; and the tear-drop-shaped through-passages being arranged in the rotatably movable part of the control cartridge.

18. The fitting as claimed in claim 1, wherein said bearing element has a fastener portion fastenable to a fitting base.

19. The fitting as claimed in claim 18, wherein said fastener portion of said bearing element is fastenable to a washbasin.

* * * * *

UNITED STATES PATENT AND TRADEMARK OFFICE
CERTIFICATE OF CORRECTION

PATENT NO. : 5,720,316
DATED : February 24, 1998
INVENTOR(S) : Vittore SIMOTTI and Arthur BRUNNER It is certified that error appears in the above-indentified patent and that said Letters Patent is hereby corrected as shown below:

On title page, in item [19], change "Simotti" to --Simotti et al.--;
in item [75], please add --Arthur Brunner, Jonen, Switzerland--.

Signed and Sealed this

Twenty-third Day of June, 1998

Attest:

BRUCE LEHMAN

*Attesting Officer*  *Commissioner of Patents and Trademarks*